(12) United States Patent
Bin

(10) Patent No.: US 6,364,108 B1
(45) Date of Patent: Apr. 2, 2002

(54) BOX FOR PACKAGING OR STORING DVDS CDS AND/OR VCDS

(75) Inventor: Ke Wen Bin, Taoyuan Hsien (TW)

(73) Assignee: CMC Magnetics Corporation, Taipei (TW)

( * ) Notice: Subject to any disclaimer, the term of this patent is extended or adjusted under 35 U.S.C. 154(b) by 0 days.

(21) Appl. No.: 09/645,481

(22) Filed: Aug. 24, 2000

(30) Foreign Application Priority Data

Jun. 19, 2000 (TW) .......................................... 89210467

(51) Int. Cl.[7] .............................................. B65D 85/57
(52) U.S. Cl. ..................................... 206/310; 206/308.1
(58) Field of Search .............................. 206/308.1, 310, 206/309, 493

(56) References Cited

U.S. PATENT DOCUMENTS

| | | | | |
|---|---|---|---|---|
| 5,377,825 A | * | 1/1995 | Sykes et al. ................ | 206/310 |
| 5,400,902 A | | 3/1995 | Kaminski | |
| 5,586,651 A | * | 12/1996 | Krummenacher ........... | 206/310 |
| 5,685,427 A | * | 11/1997 | Kuitems et al. ............. | 206/310 |
| 5,988,375 A | * | 11/1999 | Chang ....................... | 206/308.1 |
| 5,996,788 A | * | 12/1999 | Belden, Jr. et al. ......... | 206/310 |
| 6,065,594 A | * | 5/2000 | Sankey et al. .............. | 206/310 |
| 6,123,192 A | * | 9/2000 | Rufo, Jr. .................... | 206/308.1 |
| 6,170,656 B1 | * | 1/2001 | Cerda-Vilaplana et al. ...... | 206/308.1 |
| 6,276,524 B1 | | 8/2001 | Cerda-Vilaplana et al. | |

FOREIGN PATENT DOCUMENTS

| | | |
|---|---|---|
| EP | 0 989 564 A1 | 2/2000 |
| WO | WO 97/36298 A1 | 10/1997 |

* cited by examiner

*Primary Examiner*—Luan K. Bui
(74) *Attorney, Agent, or Firm*—Christensen O'Connor Johnson Kindness PLLC

(57) ABSTRACT

A DVD, CD or VCD storage box composed of a body, a cover, a molded hinge mechanism, recesses for opening the box, an annular peak element, an annular rib, a push-down platform, at least one cantilever beam and a surface. The peak element extends upward from the body to support a disc. The push-down platform is surrounded by the peak element. The cantilever beam is also surrounded by the annular peak element. The peak element can also be surrounded by an annular rib. The cantilever beam has a free end with a protrusion formed at the free end to constrain the stored disc. The surface is connected between the push-down platform and the cantilever beam such that the disk is released from the protrusion of the cantilever beam when a load is applied to the push-down platform.

5 Claims, 7 Drawing Sheets

BOX FOR PACKAGING OR STORING DVDS CDS AND/OR VCDS

BACKGROUND OF THE INVENTION

1. Field of the Invention

The present invention relates in general to a box for storage or packaging of DVDs (Digital Versatile Discs), CDs (Compact Discs) and/or VCDs (Video Compact Discs). In particular, the present invention relates to a new box design that is able to house different sized and/or shaped discs, offers better disc protection and is easier to manufacture than conventional DVD, CD or VCD boxes.

2. Description of the Related Art

FIGS. 1 and 2 depict a conventional DVD box composed of a box body 10 a cover 20 and a frame 11. Cover 20 is connected to box body 10 by a molded hinge mechanism while frame 11 is connected to box body 10 at its perimeter to form the box shape. The primary functions of the box are storage and protection of the contents (the disc). A recess 111 is formed on frame 11 allowing the user a way to open the box. Further, an annular rib 12 comprised of inner flange 121 is inside the box for the purpose of supporting the disc 30. A pair of engaging elements 13 are provided inside the area surrounded by rib 12. Each engaging element 13 has a cantilever beam 130, a hemicycle-shaped portion 131 connected to the free end of the cantilever beam(s) 130, and a protrusion 132 formed at the rim of the hemicycle-shaped portion 131. It is noted that a gap is provided between the pair of engaging elements 13.

FIG. 3 shows the box with a disc mounted therein, wherein disc 30 is affixed by engaging elements 13 via disc 30's central hole 31. Also note that the rim of disc 30 rests on inner flange 121 of the annular rib 12.

To remove disc 30 from the box, the user pushes down the hemicycle-shaped portion 131 of the engaging elements 13 thereby rotating the cantilever beams 130 of the engaging elements 13 in the direction(s) of A, A'. Disc 30, supported by annular rib 12, does not move downward but rather temporarily deforms. Gap 14 is designed to allow the hemicycle-shaped portions 131 to move closer during the lowering of the engaging elements 13. Disc 30 is thereby released from protrusions 132 of engaging elements 13 and springs upward. The user can now remove the disc 30.

A conventional DVD, CD or VCD box has the following flaws: (1) Disc 30 is supported by inner flange 121 of the annular rib 12. The contact area is over-sized to the extent that stored media could be damaged or destroyed by friction between disc 30 and the flange 121. (2) Disc 30 springs upward from reaction force generated by flange 121 as a result of the user pushing down hemicycle-shaped portions 131 of engaging elements 13. However, if disc 30 is small in size or not circular as shown in FIG. 4, the edges of disc 30 do not come into contact with inner flange 121 of rib 12. Hence, the user cannot remove such a disc 30 simply by pushing down the hemicycle-shaped portions 131 of engaging elements 13. Therefore, a smaller sized disc 30 or a non-circular disc 30 may not be suitably stored or protected by the conventional box as described above. (3) The cantilever beams 130 of engaging elements 13 extend upward at an inclined angle. Such a structure complicates the building of production molds and separating the box from the mold is inconvenient.

SUMMARY OF THE INVENTION

An object of the present invention is to provide a DVD, CD or VCD box in which the contact area between the disc and the box is relatively small thereby protecting the disc and any data stored thereupon.

Another object of the present invention is to provide a DVD, CD or VCD box suitable for discs of different size and/or shape.

Another object of the present invention is to provide a DVD, CD or VCD box having no elements extending at inclined angles thereby simplifying the manufacturing process.

The DVD, CD or VCD box of the present invention includes a body, a cover, an annular peak element, a push-down platform, at least one cantilever beam and a surface. The cover is connected to the box body by a molded hinge-type mechanism. The peak element is located in the box body to support a disc. The push-down platform is encircled by the peak element. The cantilever beam is also surrounded by the annular peak element and is connected to the surface at a right angle. Furthermore, the cantilever beam has a free end with a protrusion formed at the free end to constrain the disc. The surface is connected between the push-down platform and the cantilever beam whereby the disk is released from the protrusion of the cantilever beam when a load is applied to the push-down platform.

As mentioned above, the disc is supported by the annular peak element. The contact area between the disc and the annular peak element is minimized to protect the disc and any data stored thereupon. Furthermore, the annular peak element encircles the push-down platform thereby supporting the disc. Even if the disc is small in size or is not circular, the annular peak element provides a physical contact with the disc so that the disc can spring up and release as a result of the reaction force generated by the peak element. It is therefore understood that every kind of known DVD, CD or VCD is suitable for storage or protection using the box of the present invention.

Lastly, the cantilever beam extends from the surface at a right angle as opposed to an inclined angle. Such a structure is more suitable for the building of molds used in manufacturing and, separating the box from the mold is considerably easier.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE PREFERRED EMBODIMENT

Figure 1:
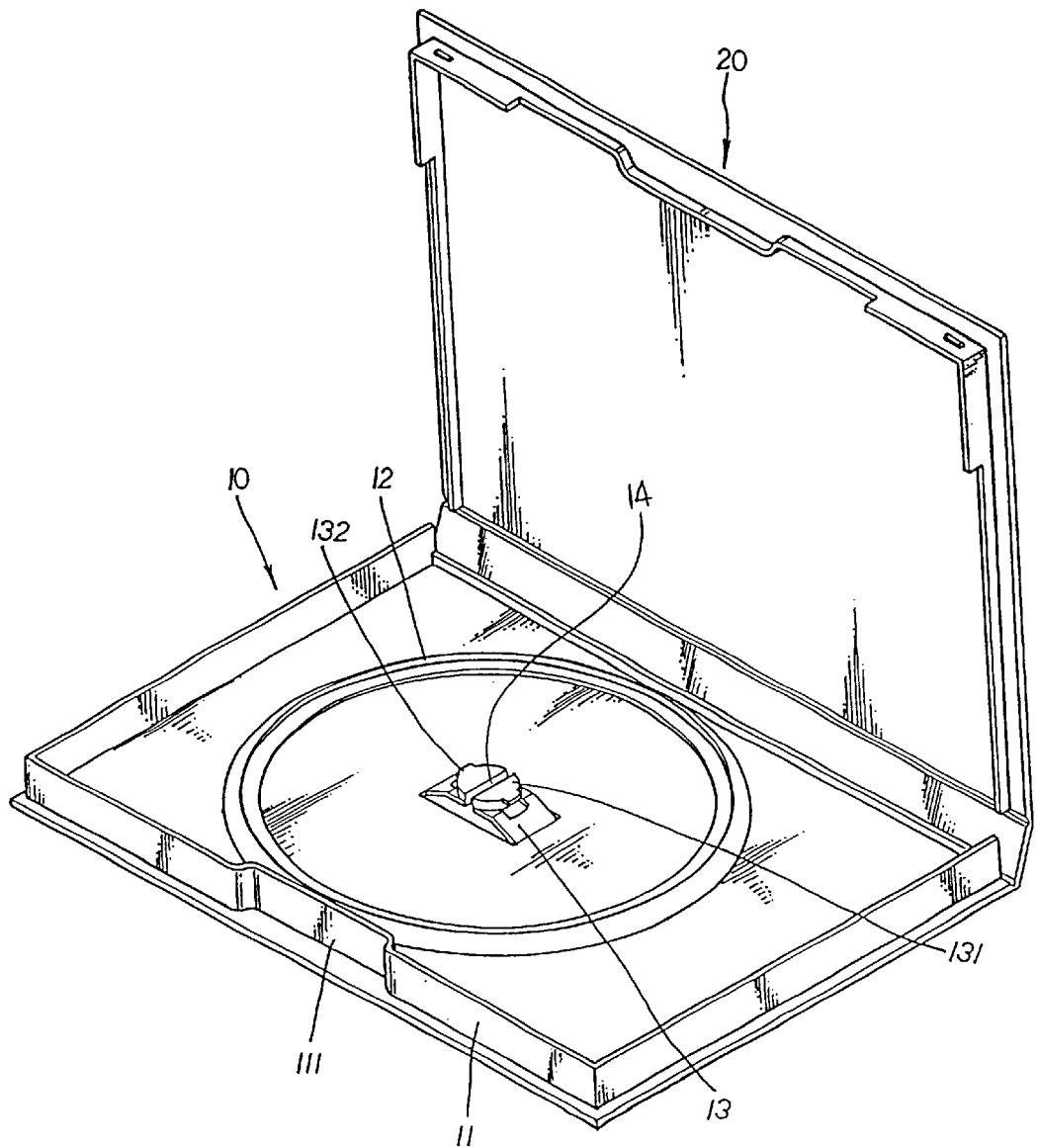
FIG. 1 is a perspective diagram of a conventional DVD, CD or VCD box.
Figure 2:
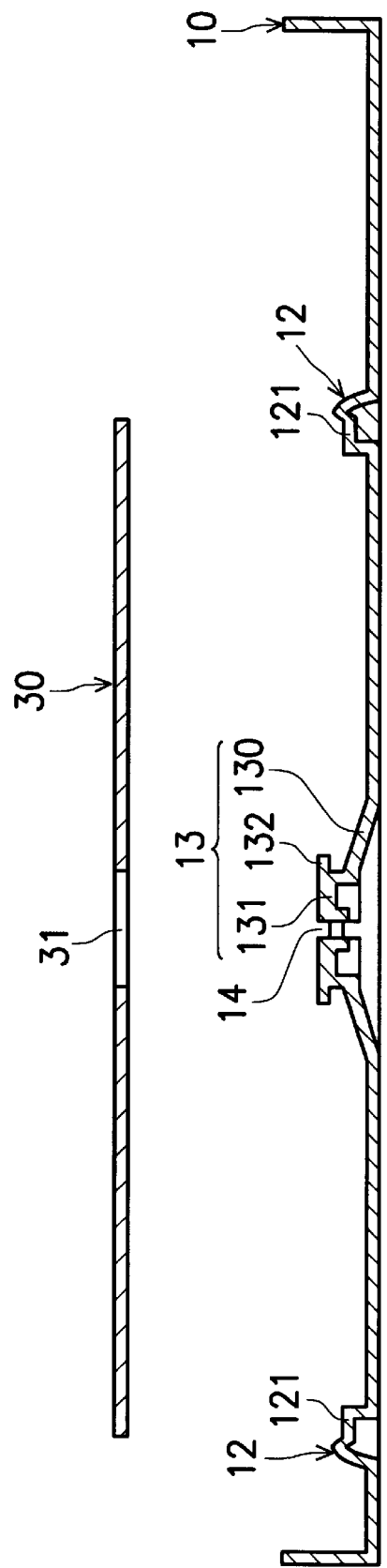
FIG. 2 is a cross-sectional diagram of a conventional DVD, CD or VCD box.
Figure 3:
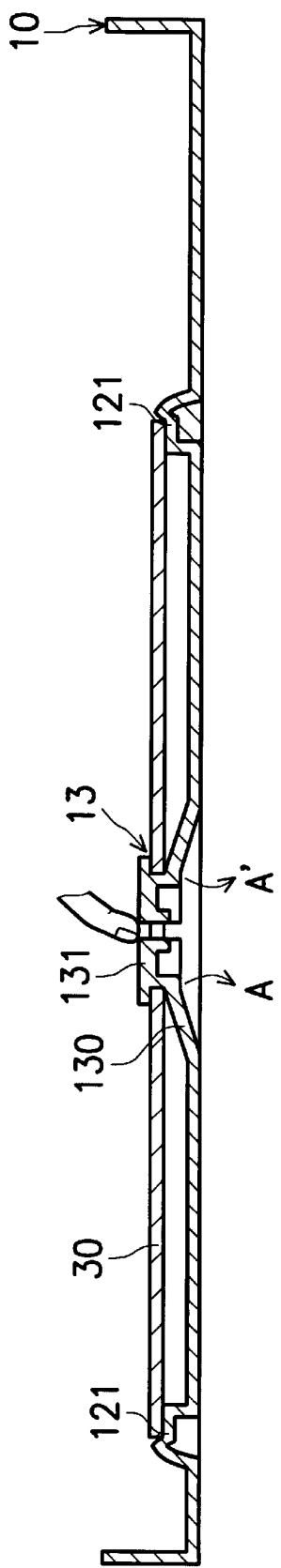
FIG. 3 shows the method for removing a disc from a conventional DVD, CD or VCD box.
Figure 4:
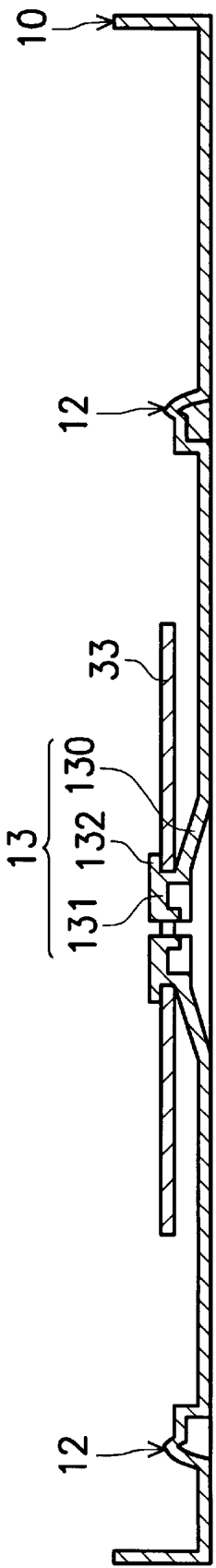
FIG. 4 shows a conventional DVD, CD or VCD box with a small or non-circular disc mounted therein.
Figure 5:
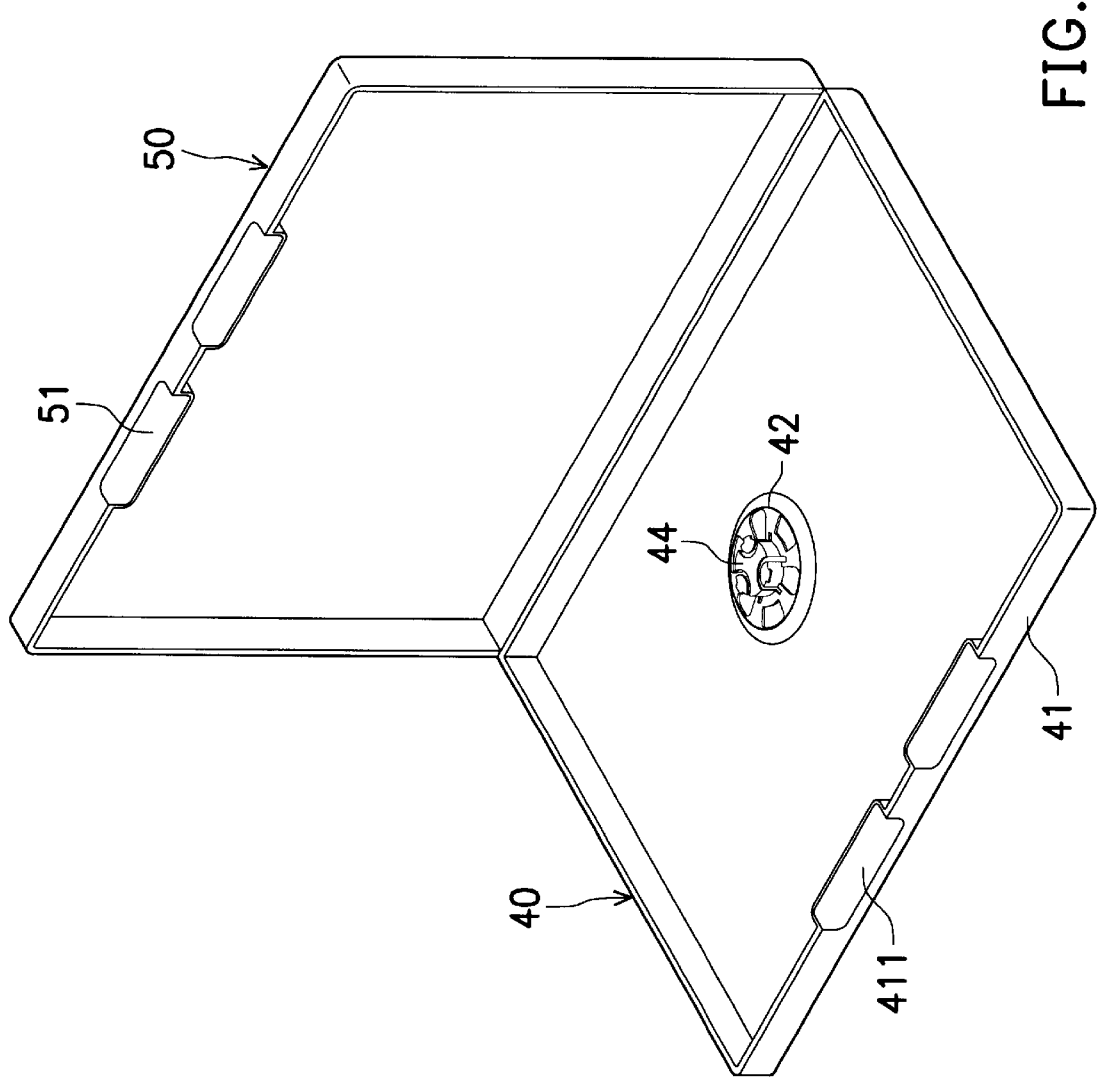
FIG. 5 is a perspective diagram of a DVD, CD or VCD box in accordance with a first embodiment of the present invention.
Figure 7:
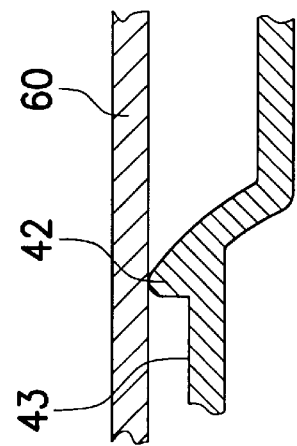
FIG. 7 is a cross-sectional diagram of FIG. 6 along line VII—VII.
Figure 6:
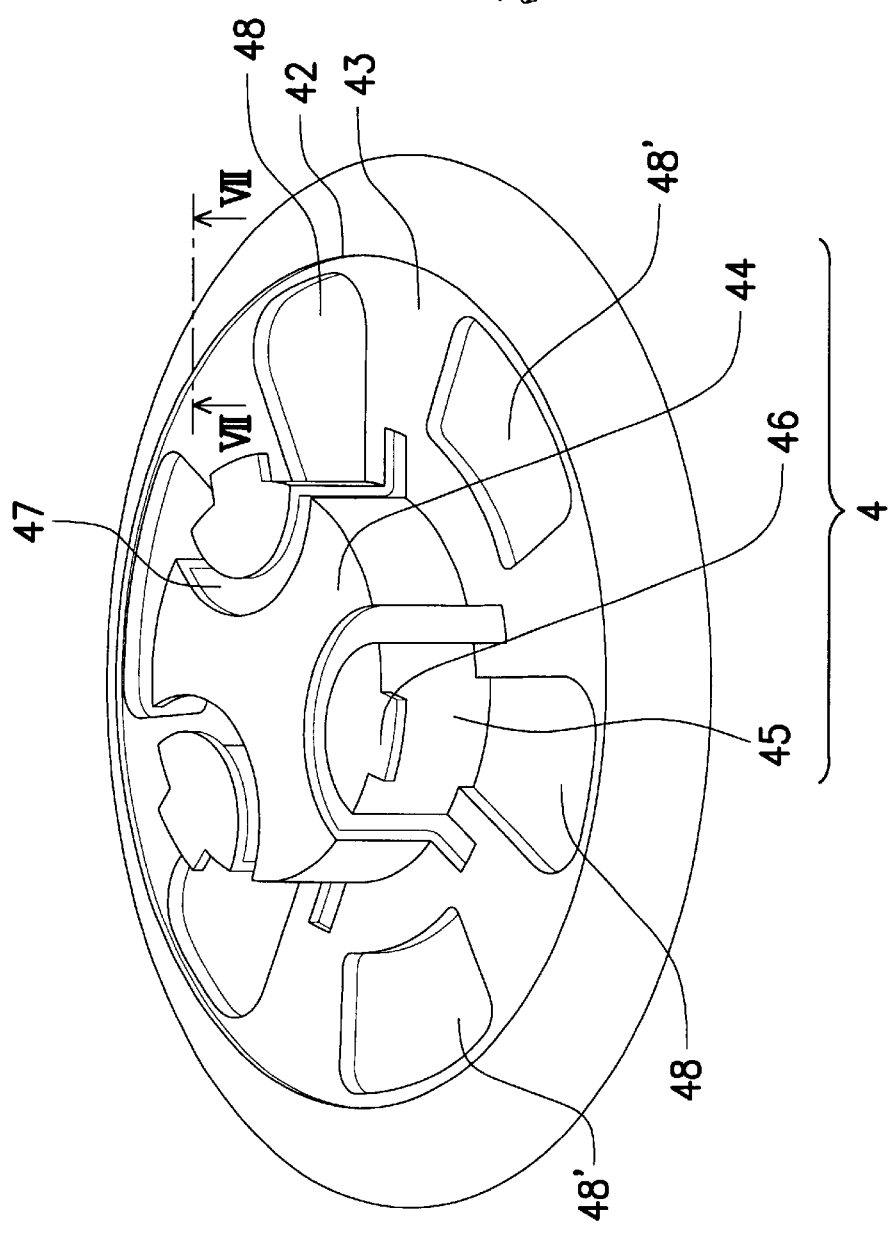
FIG. 6 is a local, enlarged view of FIG. 5.

FIG. 5 depicts a DVD, CD or VCD box of a first embodiment of the present invention. The primary box components are a box body 40 and cover 50. The box body has a frame 41 at its perimeter (to protect the contents of the box), and cover 50 is connected to frame 41 using a molded hinge design. Recesses 411 and 51 oppose one another and are formed on frame 41 and cover 50, respectively. These recesses allow the user to open the box. An annular peak 42 is provided inside the box for supporting a disc. In FIGS. 6 and 7, annular peak 42 is connected to an engaging element 4 via a surface 43. Engaging element 4 has a push-down platform 44 protruding from surface 43 and three cantilever beams 45 symmetrically arranged along side the push-down platform 44. Note that gaps 47 are provided between push-down platform 44 and cantilever beams 45. Each cantilever beam 45 has a protrusion 46 formed at its free end. A plurality of openings 48 are provided on surface 43 adjacent to the cantilever beams 45, to make the cantilever beams 45 more flexible. Also, other openings 48' are provided on surface 43 and positioned beside push-down platform 44, to also make surface 43 more flexible.

When a disc is mounted in the box, the disc is engaged with engaging element 4 at the disc's central hole. As shown in FIG. 7, disc 60 rests on annular peak 42 such that the contact area is very small. Hence, friction between disc 60 and annular peak 42 is minimized.

To remove the disc from the box, the user pushes down on platform 44 of engaging element 4. Platform 44 then sinks as cantilever beams 45 are pulled inward, toward platform 44. Disc 60 is thereby released from protrusions 46 of the engaging element 4 and spring upwards. The user can now remove the disc.

The DVD, CD or VCD box of the present invention has the following advantages: (1) The disc is supported by a small annular peak thereby minimizing the contact area between the disc and the annular peak in an effort to protect the disc and any data stored therein. (2) Annular peak 42 encircles push-down platform 44 in a design that provides physical contact with the disc even if the disc is small in size or is not circular thereby enabling any stored disc to spring up from the reaction force of peak 42. Hence, every kind of known disc is suitable for storage in the DVD, CD or VCD box of the present invention. (3) The cantilever beams 45 of the engaging element extend up from surface 43 at a right angle, not an inclined angle. This structure is more suitable for building the molds used in manufacturing and allows for easier separation of the box from the mold.

Figure 8:
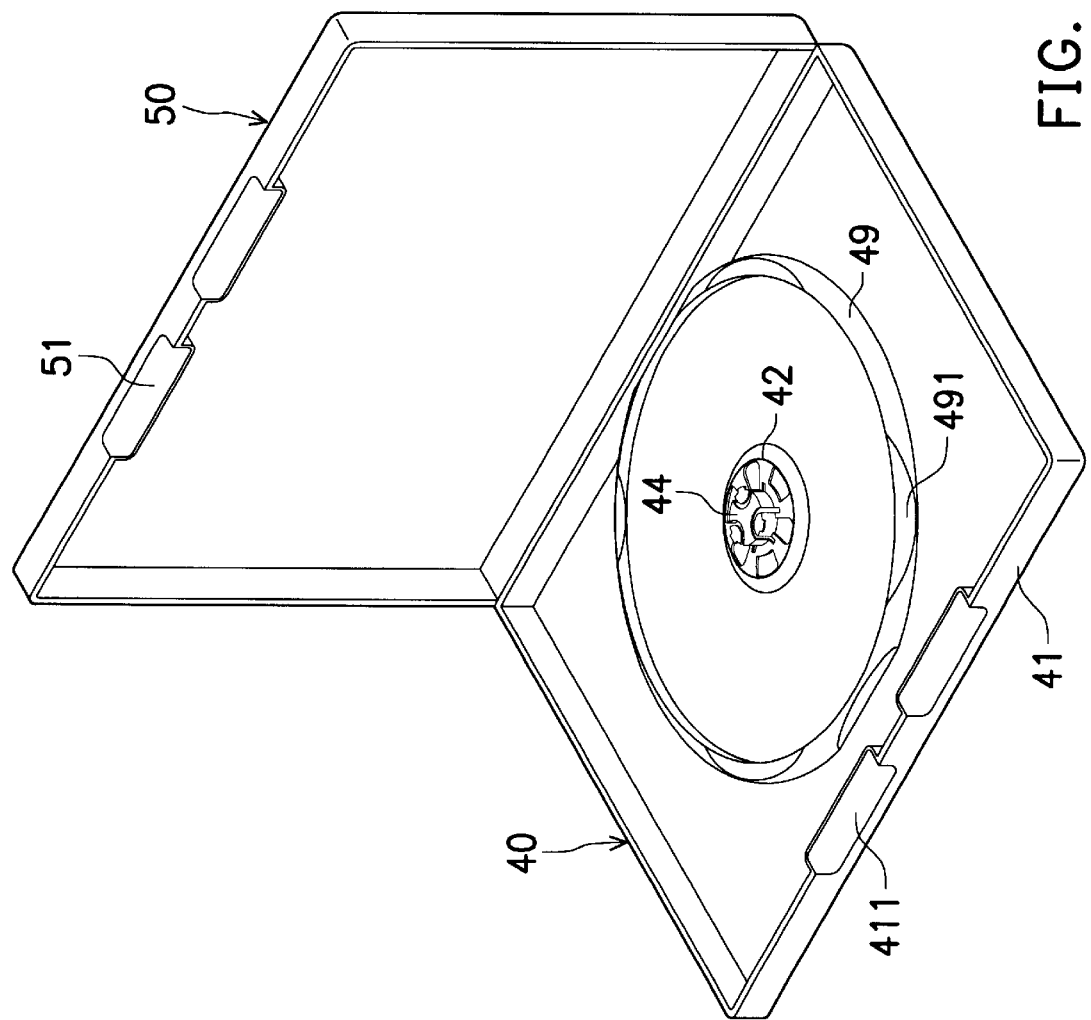
FIG. 8 is a perspective diagram of a DVD, CD or VCD box in accordance with a second embodiment of the present invention.

FIG. 8 shows a DVD, CD or VCD box in accordance with a second embodiment of the present invention. Note that the elements disclosed are the same as in the first embodiment, are given the same reference numerals and the introductions thereof are consequently omitted. In the second embodiment, an annular rib 49 encircles annular peak 42 in a design to further protect the disc. Recesses 491 are provided on rib 49 thereby allowing the user to more easily remove the disc.

Finally, while the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A box for storing a disk having a central hole, the box comprising:

a body;

a cover rotatably connected to the body;

an annular support element extending upwardly from the body;

a flexible panel encircled by and connected to the annular support element;

a push-down platform extending upwardly from the flexible panel, the push-down platform having a plurality of recesses; and a plurality of retention beams extending upwardly from the flexible panel, each retention beam being disposed substantially in one of the plurality of recesses in the push-down platform such that the push-down platform and retention beams cooperatively define a generally cylindrical post adapted to be inserted through the central hole of the disk, each retention beam having a free end and an outwardly disposed retention tab formed at the free end to engage the disk;

wherein a downward force on the push-down platform will cause the flexible panel to flex, and the free end of at least one of the retention beams to rotate inwardly, thereby releasing the disk.

2. The box as claimed in claim 1, further comprising at least one aperture through the flexible panel adjacent to at least one of the plurality of retention beams.

3. The box as claimed in claim 1, wherein the plurality of retention beams disposed symmetrically about the push-down platform.

4. The box as claimed in claim 1, further comprising an annular rib encircling the annular support element to protect the disk.

5. The box as claimed in claim 1, wherein each of the plurality of retention beams is connected to the flexible panel at a right angle.

* * * * *